United States Patent [19]
Best

[11] 3,990,717
[45] Nov. 9, 1976

[54] COLLAPSIBLE VEHICLE

[76] Inventor: Melvin H. M. Best, 131 Marine Ave., Wilmington, Calif. 90744

[22] Filed: Sept. 12, 1975

[21] Appl. No.: 612,691

Related U.S. Application Data

[63] Continuation of Ser. No. 465,340, April 26, 1975, abandoned.

[52] U.S. Cl. .............................. 280/278; 280/287; 74/551.4; 74/594.7
[51] Int. Cl.$^2$ .......................................... B62K 15/00
[58] Field of Search ........ 280/281, 278, 287, 87.05; 74/551.4, 594.7

[56] References Cited
UNITED STATES PATENTS

| | | | |
|---|---|---|---|
| 3,354,976 | 11/1967 | Camps | 180/32 |
| 3,448,997 | 6/1969 | Kosugi | 280/281 |
| 3,572,757 | 3/1971 | Camps | 280/281 |

FOREIGN PATENTS OR APPLICATIONS

| | | | |
|---|---|---|---|
| 873,573 | 3/1942 | France | 280/278 |
| 335,834 | 12/1903 | France | 280/287 |
| 927,215 | 4/1947 | France | 280/287 |
| 369,574 | 3/1939 | Italy | 280/287 |

Primary Examiner—Kenneth H. Betts
Attorney, Agent, or Firm—Herzig & Walsh

[57] ABSTRACT

A collapsible vehicle which in the exemplary form is a two wheeled vehicle driven by pedals and a sprocket chain. The frame is articulated with joints between frame members, permitting collapsing of the frame members into a substantially parallel relationship in the plane of the frame. Further joints allow collapsing of the frame members in a direction normal to the plane of the frame and into a position with the two wheels opposite each other on opposite sides of the frame members. The frame members include collapsible handlebars, steering column, and seat supporting members.

17 Claims, 16 Drawing Figures

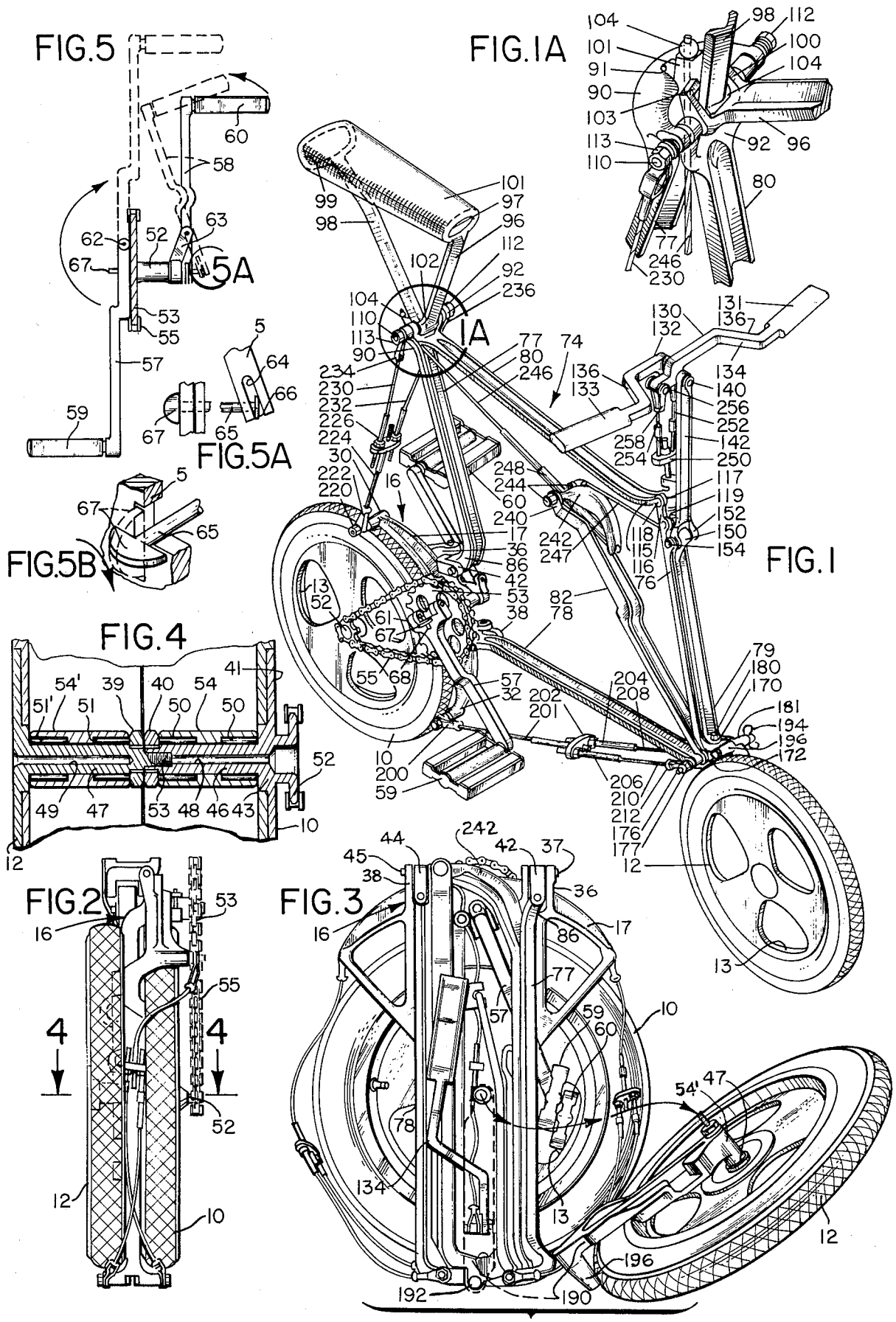

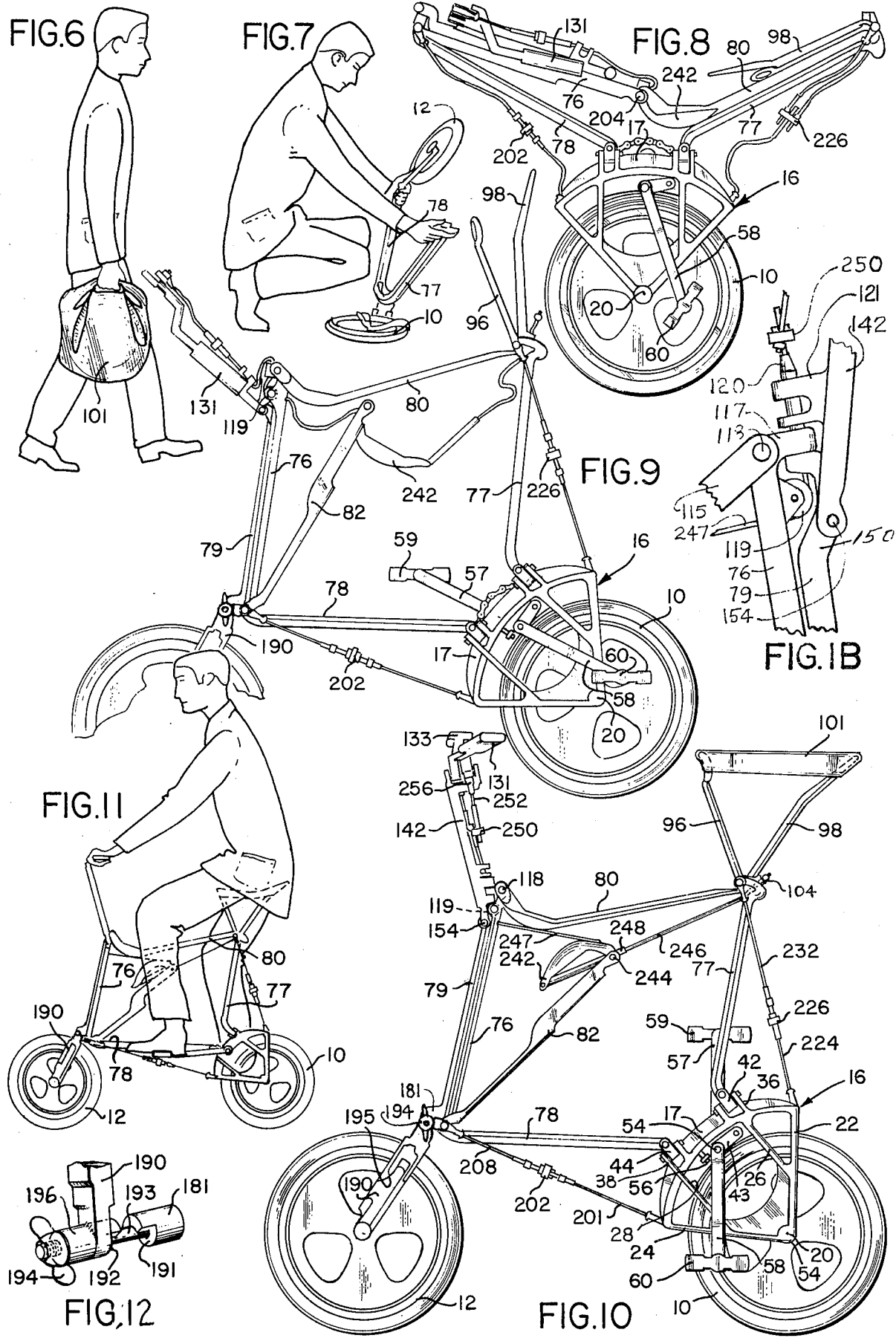

3,990,717

COLLAPSIBLE VEHICLE

This is a continuation of application Ser. No. 465,340, filed on Apr. 26, 1975, now abandoned.

FIELD OF THE INVENTION

The field of the invention is that of wheeled vehicles and more particularly a collapsible two-wheeled vehicle capable of being folded or collapsed into an extremely small lightweight configuration, making it possible to carry the vehicle in a container resemblind a handbag.

BACKGROUND OF THE INVENTION

It has long been recognized that there is a need in the art for a vehicle capable of providing a means of transportation and which is capable of being folded or collapsed into a small enough configuration to enable it to be carried about by hand or in another vehicle without imposing any problems due to its size or weight. It has been known in the prior art to provide vehicles, such as a bicycle with joints, allowing a limited amount of collapsing or folding of the vehicle or bicycle. However, such attempts as have been made in the prior art have not offered any significant advantage, due to the fact that they did not make possible or realize the capability of folding the vehicle into a small enough and light enough configuration to be significant. If the vehicle such as a bicycle, for example, is substantially as bulky when collapsed or folded as when erected, no particular advantage is gained from the collapsibility. In other words, the prior art never realized the capability of being able to collapse a vehicle into a small and light enough configuration to be significant. The herein invention is entirely unique, and outstrips any prior art in the field in realizing the end that a wheeled vehicle which when erected is fully capable of transporting an adult human being at substantial speed, but yet which is collapsible into an extremely small configuration such that it can be transported in a container simulating a handbag in size. The invention has made possible a collapsible vehicle which can be folded into a sufficiently small size that it can readily be manually carried or transported in another vehicle without any impediment arrising from the size or weight of the article when collapsed in compact form. In addition to the primary objective of realizing this very significant end, the invention realizes a number of other corollary objectives.

SUMMARY OF THE INVENTION

In an exemplary form of the invention as described in detail herein, it takes the form of a two-wheeled vehicle on which a person can ride and which is driven by pedals through a sprocket chain. The vehicle is a form of bicycle, but preferably, with wheels of relatively smaller size.

In the exemplary form of the invention, the vehicle is provided with a collapsible, articulated frame comprised of jointed frame members which form a quadrilateral lying substantially in a plane when the vehicle is erected. Also, there is provided collapsible steering handlebars, a collapsible steering column, and collapsible seat supporting members. Flexible tension cable members are provided having such relationship to the joints between members so as to become taut and to act on the joints to hold the vehicle firm when in erected condition.

A further object is to realize the characteristic in the vehicle that individual frame members are single function members which for the most part, are held in compression when the vehicle is erected.

A further object is to realize a collapsible frame, which is a rigid structure when erected having tension members which hold the frame members in a rigid erected configuration.

A further object is to realize the capability of folding into an extremely small compact configuration by way of providing frame joints allowing frame members to be folded or collapsed into a closely adjacent parallel relationship with further joints then allowing the frame members to be folded to a compact position between the front and rear wheels.

A further object is to realize a foldable vehicle as in the foregoing having flexible cable members connected between certain joints so related to them so as to hold the joints in a rigid erected condition when the frame of the vehicle is erected.

A further object is to realize a vehicle of the type referred to with additional jointed frame members providing for seat support and additional jointed members providing for collapsible steering handlebars.

BRIEF DESCRIPTION OF THE DRAWINGS

Further objects and additional advantages of the invention will become apparent from the following detailed description and annexed drawings, wherein:

FIG. 1 is a perspective view of a preferred form of the vehicle in erected position;

FIG. 1A is a detail view of the joint between frame members and seat supporting members;

FIG. 1B is an enlarged detail view of the joint of the upper forward apex of the frame;

FIG. 2 is a view of the vehicle in fully folded or collapsed condition;

FIG. 3 is a plan view of the vehicle in collapsed condition with the front wheel removed to expose the folded frame;

FIG. 4 is a sectional view taken along line 4—4 of FIG. 2;

FIG. 5 is a detail view of the pedals and pedal cranks;

FIG. 5A is a detail of FIG. 5;

FIG. 5B is a further detail of FIGS. 5 and 5A;

FIG. 6 is a pictorial view illustrating the small size of the folded vehicle;

FIG. 7 is a pictorial view illustrating a first step or stage in erection;

FIG. 8 is a view of the vehicle in partly erected condition;

FIG. 9 is a view of the vehicle in a further state or condition of erection;

FIG. 10 is a side view of the vehicle fully erected;

FIG. 11 is a schematic view illustrating use of the vehicle;

FIG. 12 is a detail view of the attachement of the front wheel arm.

DESCRIPTION OF THE PREFERRED EMBODIMENT

Construction of the vehicle when fully erected can be readily understood from FIG. 1. The constructional features enable complete collapsing of the vehicle and the manner of collapsing and erecting will be understood from the description of FIGS. 2 through 10.

In the exemplary form of the vehicle, iit manifests itself as a two wheeled cycle driven by a sprocket chain and pedals. As shown, there are two wheels which may be conventional wheels designated at 10 and 12 which are disc wheels having holes 13 having rubber tires and then may be about 12 inches in diameter. Numeral 16 designates generally a frame member which carries the rear wheel. It is to be observed that this member is on one side of the rear wheel. This member may be seen from the opposite side in FIGS. 8—10. Preferably, it may be constructed as a casting which has an arcuate part or member 17 having a radius centered at 20, the center of the axle of rear wheel 10 in FIG. 10. The frame or wheel support member 16 includes two radial arm portions 22 and 24 which extend to the end of arcuate member 17. Numerals 26 and 28 designate two additional parallel braces or portions which extend arcuate 17 and radial portions 22 and 24 (see FIG. 10). Frame 16 supports the journal bearing for the shaft of the pedal crank as will be described.

At the opposite ends of arcuate portion 17 are transverse bushings 30 and 32 which will be described more in detail presently (see FIG. 1).

Frame member 16 has a fixed extending yoke or fork 36 and a second extending yoke or fork 38, these yokes being bifurcated as shown whereby further yokes can be pivotally mounted between their legs to provide universal joints as will be described. Pivoted between the legs of yoke 36 is a further yoke 42 offset as shown and having legs as shown and as will be further described. Pivoted between the legs of yoke 38 is a further yoke 44 having legs between which a frame member is pivotally secured, as will be described (see FIGS. 1, 3, and 10).

FIG. 4 is a cross section through the axis of wheels 10 and 12 in the folded configuration, FIG. 2. Bushings 46 and 47 are axially aligned in the configuration of FIGS. 2 and 4. Bushing 46 is integral with disc 41, boss 43, and sprocket 52 on wheel 10. Bushing 47 on wheel 12 has a threaded stem 53 threaded into the bore of bushing 46 in FIG. 4. Bushing 47 is integral with wheel 12. Bushings 46 and 47 have bores 48 and 49 and are journalled in needle bearings 50, 50' and 51, 51' which are in bearing races in bushings 54 and 54' surrounding bushings 46 and 47. Bushing 54 is part of frame 16, and bushing 54' is at the end of front wheel arm 190 to be described. Numerals 39 and 40 designate hex nuts on the inner threaded ends of bushings 46 and 47.

Numeral 53 designates a second sprocket wheel which is journalled on a bushing which extends laterally from pivoted arm 43 pivotally carried by frame 16 and adjustable in position by set screw 56 (see FIGS. 10 and 5). Sprocket wheel 53 drives sprocket wheel 52 through sprocket chain 55.

Pedal arms 57 and 58 are coupled to shaft 54 and can rotate sprocket wheel 53 as shown more in detail in FIG. 5. Also, pedals 59 and 60 are connected to pedal arms 57 and 58. Pedal arm 57 has a forked end 61 pivoted on pin 62 carried on sprocket wheel 53 so that it can be folded from the full line position of FIGS. 1 and 5 to the dotted line position of FIG. 5. Pedal arm 58 is pivoted to arm 63 so that is can be folded into a position as shown in dotted lines in FIG. 5. The end of arm 58 is slotted as shown at 64 in FIG. 5A. It engages stem 65 having head 66. On the end of stem 65 is a flat head 67 which fits into slot 68 in the pivoted end yoke of pedal arm 57 when the arms are in active position. Head 67 is manually rotated 90° to lock pedals in working mode (see FIg. 5B).

The frame of the vehicle includes a plurality of frame members. One of them is parallel to a front steering column. The frame supports the front and rear wheels, a seat, and steering arms or handlebars which are constructed to be able to actuate the steering column, as will be described.

The frame includes a group of frame members which in the erected position of the vehicle form a quadrilateral lying in a plane designated at 74 in FIG. 1. The frame members may be made of relatively light metal or other material. Preferably, they may have a U or V-shaped cross section as shown with the necessary strength and lightness.

The frame members include a front member 76 which is adjacent the steering column member 79, a rear member 77, a lower or bottom member 78, and a top member 80. They all may have the same general cross sectional configuration. Numeral 82 designates a further partial diagonal member which will be referred to again presently.

Lower frame member 78 has its rear end joined, that is, pivotally attached between the legs of yoke 44 which in turn is pivotally carried by yoke 38. Thus, it is to be seen that frame member 78 is joined or hinged at its end so that it can fold in the plane of frame 74 relative to yoke 42. Additionally, it can swing angularly in a direction out of the plane of frame 74 about pivot pin 45 of yoke 38.

Referring to rear frame member 77, it will be noted that it is curved at its end designated at 86. This end is pivotally joined between the legs of yoke 42 on pin 37. Thus, again, it may be seen that frame member 77 is hinged so that it can collapse or fold in the plane of frame 74 about yoke 42. Also, the end of frame member 77 can move angularly in a direction normal to the plane of frame 74 about yoke 36 (see FIG. 3).

The upper end of rear frame member 77 is formed as a fork as designated at 90 having a slot 91. The rear end of top frame member 80 is also formed as a fork 92 which is narrower so as to fit between the forks of fork 90. Numeral 96 designates a forward seat support member. Numeral 98 designates a rear seat support member. These members have end openings 97 and 99 to support a seat boot 101 which is a fabric member that also forms the carrying case shown in FIG. 6. The lower end of member 96 is forked at 100. Bushing 104 has extending lug 101 having a bore through which extends the end of cable 246 held by knob 247. Lug 101 fits into slot 91 which limits angular movement. At the lower end of frame member 98, there is a bushing 104. The forks of fork 100 have inturned lugs 103 a their ends which can engage member 98 limiting relative angular movement. Bushing 104 is journalled on a transverse stem 110 in a position between the forks of fork 100 and fork 92 which are also journalled on this stem. The forks of fork 90 are journalled on the same stem with forks 92 between the forks 90 and the ends of members 96 and 98 as shown. Stem 110 is in the form of a bolt having head 112 at one end and a nut 113 on the other end. From the foregoing, it may be seen that members 77, 80, 96, and 98 all can move angularly about pin 110 in the plane of frame 74 as will be described (see FIG. 1a). The relationship between the parts journalled on stem 110 is that in the erected position, they are held firm in a limiting angular position.

The front end of frame member 80 is forked at 115, and pivoted to frame member 76 by means of a transverse pivot pin 118. Thus, it can be seen that these two members can move angularly relative to each other in the plane of frame 74. Member 76 carries a grooved roller 119.

Numerals 130 and 132 designate a pair of steering arms or handlebars with handles 131 and 133. Each handle has an offset 134 and 136 in its length. The two steering arms are pivoted together near their inner ends on a pivot pin 140. Also attached to this pivot pin is steering link 142. On the front of steering column 79 is an extending lug 150. The lower end of link 142 is forked at 152. This fork straddles lug 150 and is secured thereto by pivot pin 154. Thus, as can be seen, handles 131 and 133 can be manipulated so that through link 142, steering column 79 is turned angularly for steering. On the inside of link 142 is the bifurcated lug 121. Between this lug and the upper end of column 79 is laterally extending end 117 of member 76. Members 121, 117, and the end of column 79 have aligned bores receiving stem 120 to which is connected the end of cable 247. Stem 120 extends to fitting 250 (see FIGS. 1 and 1B).

At the lower end of front frame member 76, there is a foot 172, and at the front end of steering column 79, there is a similar foot 170. The ends of frame members 78 and 82 are forked, and they are pivoted on a transverse pin formed by bolt 176 having a nut 177 on its end. Feet members 170 and 172 are further pivoted together by way of a generally vertical pivot pin 180. Foot 170 has an extending lug 181 integral therewith that carries the front wheel support arm.

Numeral 190 designates a front wheel supporting arm which is attached to lug 181. The front wheel support member 190 has a laterally extending hub member 196 in which the axle pin of the front wheel 12 is journalled (see FIG. 3). As may be seen, when steering column member 79 is turned by handlebars 131 and 133, front wheel support arm 190 is similarly moved angularly for steering.

Lug 181 has an axial shoulder 191. At the end of arm 190 is a complementary shoulder 192. Arm 190 is held by bolt 193 and wing nut 194 (see FIG. 13). For collapsing, wing nut 194 is loosened; the shoulders disengage; and arm 190 is rotated through about 165°. One side of arm 190 is recessed as shown at 195; and when folded, it can overlie steering arm 132 which fits into the recess.

As previously described, FIG. 1 shows the vehicle in erected positon. Frame 74 forma a quadrilateral lying substantially in a plane. Flexible cable tension members are provided so arranged that when the vehicle is erected and a clamp is set for holding the vehicle erected, all of the cables are under tension and they are positioned to exert forces on the frame members to hold or restrain all of the joints in erected condition, erecting a rigid structure. When the clamp is released, as will be described, tension in all of the cables is released; all of the hinged joints are able to collapse; and the vehicle can then be collapsed into a very small package, as will be described.

Referring again to bushing 32, (FIG. 1), extending from it is a swivel fitting 200 to which is secured the flexible cable 201 connected to a further double fitting 202 having adjusting fittings 204 and 206 for two additional cables 208 and 210. Fittings 204 and 206 are in the form of sleeves with a hexagonal nut part, and a threaded stem engage fitting 202 with nuts on the threaded stems for adjusting tension. These additional cables extend to swivel fittings 212 and 214 secured to transverse pin 176. In erected position as shown, there is tension in cables as described so as may be seen, lower frame member 78 is in compression. As may be seen also, cable 201 which is connected to bushing 32 holds support frame member 16 in a rotated position which is substantially in the plane of frame member 74 to thereby hold these elements in their erected condition.

Referring again to bushing 30 (FIG. 1) extending from it is a bolt 220 carrying a swivel fitting 222 to which is attached another flexible cable member 224 which in turn is attached to adjusting fitting 226 which is like fitting 202 and secured to it are flexible cables 230 and 232 which are attached to fittings 234 and 236 which are carried on transverse pin 110. As may be seen, the tension in these cables exerts a force on support frame member 16, urging it and holding it in the erected condition, that is, in a plane parallel to frame 74. The tension in cables 201 and 224 holds frame members 77 and 78 in compression with tension in cable 246 as will be referred to again presently. Frames 16, 77, and 78 with their associated cables form a basic assembly.

The upper end of diagonal frame member 82 is forked at 240. Numeral 242 designates a manual clamping member which is arcuate as shown and V-shaped in cross section which has one end pivoted on bolts 244 carried by forked end 240 of member 82. Numeral 246 designates an additional flexible cable, one end of which is secured to an extended projection on member 98. The point of attachment of cable 246 to member 98 is behind pin 110 and thus the erected tension on cable 246 holds seat members 96 and 98 in their fixed open-mode relationship. It has on it a protective sleeve 248. Cable 247 extends from clamping member 242 being held in a slot 245 in the clamping member. Thus, this cable extends upwardly through the bore in previously described fitting 119, and it is connected to a double fitting 250 to which are secured the ends of two additional cables 252 and 254 which are secured to swivel fittings 256 and 258, one of which is pivotally attached to the inner end of steering arm 130 the other of which is pivotally attached to inner end of the other steering arm 132.

In the fully erected position, manual clamp 242 is rotated in a counterclockwise direction as seen in FIG. 1 into an over center position relative to diagonal member 82 so that it locks in that position holding cable 246 in tension. This tension is through the cables as described holding steering arms 130 and 132 in the erected position.

FIGS. 2, 3, and 5 through 10 illustrate the manner of folding the vehicle into a small compact package and erecting it. In the collapsed condition as shown in FIGS. 2 and 3, the frame members lie generally parallel to each other and relatively close to each other and overlie the rear wheel. The front wheel then overlies the frame members directly over the rear wheel. FIGS. 7 through 10 illustrate the erecting steps from the folded condition of FIGS. 2 and 3 to the erected condition of FIG. 10. The folding operation is the reverse of the erecting steps. The collapsing and erecting of the vehicle can be best understood if considered together. FIG. 6 illustrates the relatively small size case into which the vehicle can be collapsed.

In collapsing the vehicle, manual clamp 242 is released by rotating it to unlatch as described so as to relieve tension in cable 246. When the tension is relieved, the frame can collapse from a position as shown in FIG. 10 to that in FIGS. 9, 8, 7, and 2 and 3. Frame member 80 hinges against frame member 77. Seat support members 96 and 98 rotated towards each other about their pivotal mounting and towards top frame member 80. Frame member 78 moves angularly towards frame member 82, and frame member 76 moves angularly towards frame member 82, these parts moving towards the position of FIGS. 9 and 8. Considering further folding movement from the position of FIG. 7, frame member 77 and 78 as well as members 80 and 76 move angularly towards each other so that they lie in a relationship like that of FIG. 3. Frame members 77 and 78 swing angularly in a normal direction (into the drawing, looking at FIG. 3) so that they overlie rear wheel 10. On the other hand, when erecting these parts move in the opposite directions angularly from the position of FIG. 8 to FIG. 9 and then FIG. 10.

In erecting from the folded position of FIGS. 2 and 3, all of the frame members which are lying in a plane between the wheels first swing upwardly (outwardly from the drawing) about the joints formed by yokes 36 and 38. Then, frame members 77 and 78 swing outwardly, looking at FIG. 7, about yoke joints 42 and 44.

As previously described, in erected position, hand clamp member 242 is moved in to latching position bringing cable 246 taut. The seat members 96 and 98 are erected, and steering arms 130 and 132 are erected for steering. All joints are held taut in erected condition. In the erected position, the pedal crank arms move to the full line positions of FIG. 5. In the collapsed position, pedal arm 57 and pedal 59 are in a position as shown in FIG. 3. Pedal arm 58 has its pedal 60 extending through hole 13 in wheel 10.

In collapsed condition, as previously pointed out, all of the frame members lie essentially parallel to each other as shown and are in a position between the two wheels, the axles of which are aligned, the wheels being on opposite sides of the frame members. Thus, the total package is only slightly larger than the space that would be occupied by the two wheels themselves.

From the foregoing, those skilled in the art will readily understand the nature of the construction of the invention and the manner in which all of the object and advantages as set forth in the foregoing are realized. The steps in erecting the vehicle from collapsed condition as illustrated in FIGS. 2 and 3 to the fully erected position of FIGS. 1 and 10 will be readily understood by those skilled in the art. Further, those skilled in the art will understand the steps in folding or collapsing from the erected condition of FIGS. 1 and 10 through the stages of FIGS. 9, 8, and 7 to that of FIGS. 2 and 3.

As will be observed, all members fold or collapse, including main frame members, steering arms or handlebars, and seat support members, the parts coming into a position as shown in FIGS. 2 and 3 with the front wheel overlying the rear wheel. The folded unit is locked together by spinning the front wheel so that thread 53 threads into hub 46 (see FIG. 4).

With reference to the tension cables, as has been explained, they become taut when the vehicle has been erected, the tension in them holding the frame members in compression and acting on the joints to hold the joints in a limiting angular position which is the erected position. Release of the manual clamping member releases the tension, allowing all joints to fold or collapse as described.

The foregoing disclosure is representative of a preferred form of the invention and is to be interpreted in an illustrative rather than a limiting sense, the invention to be accorded the full scope of the claims appended hereto.

What is claimed is:

1. In a collapsible wheeled vehicle, in combination: a vehicle frame comprising a plurality of frame members forming sides of the frame; and joints between adjacent frame members, whereby the frame is erectible and collapsible, the frame members normally lying substantially in a plane when the frame is erected, the joints being constructed whereby the frame members are collapsible into a compact, substantially parallel relationship and the joints being constructed to remain connected in both the erected and collapsed state of the vehicle the joints comprising pivotal connections between adjacent ends of frame members.

2. A vehicle as in claim 1, including seat means and steering means, connected to certain frame members.

3. A vehicle as in claim 2, including additional joints between the seat means and a frame member and between the steering means and a frame member, said additional joints being constructed to permit the seat means and steering means to be collapsible into substantially parallel relationship with frame members.

4. A vehicle as in claim 1, including collapsible seat supporting members and steering means, and further joints between the seat supporting members and a frame member and also further joints between the steering means and a frame member.

5. A vehicle as in claim 1, including tension means connected between certain of said joints which is tensioned when the frame is erected, the tension in the tension means being releasable for collapsing.

6. A vehicle as in claim 5, including wheels and wheel carrying members jointed to certain of said first frame members whereby the wheels are collapsible into planes parallel to the collapsed frame members.

7. A vehicle as in claim 5, including manually actuatable means for tensioning and releasing tension in the tension means.

8. In a collapsible wheeled vehicle, in combination: a vehicle frame comprising aa plurality of frame members forming sides of the frame; and joints between adjacent frame members, whereby the frame is erectible and collapsible, the frame members normally lying substantially in a plane when the frame is erected, the joints being constructed whereby the frame members are collapsible into a compact substantially parallel relationship and the joints being constructed to remain connected in both the erected and collapsed state of the vehicle, and means connecting between frame members applying forces whereby in the erected condition, the frame forms a rigid structure.

9. A vehicle as in claim 8, wherein said means comprises flexible tension members connected between frame members whereby frame members are held in compression.

10. In a collapsible wheeled vehicle, in combination: a vehicle frame comprising a plurality of frame members; and joints between adjacent frame members, the frame members normally lying substantially in a plane when the frame is erected, and the joints being constructed whereby the frame members are collapsible into a compact, substantially parallel relationship, means connecting between frame members applying forces whereby in the erected condition, the frame forms a rigid structure, said means comprising flexible tension members connected between frame members whereby frame members are held in compression, said frame members including a first frame member having two other frame members jointed to it, said flexible members including flexible members connected between said first member and ends of said two other members, and a further flexible member connected between ends of said two other members.

11. In a collapsible wheeled vehicle, in combination: a vehicle frame comprising a plurality of frame members; and joints between adjacent frame members, the frame members normally lying substantially in a plane when the frame is erected, and the joints being constructed whereby the frame members are collapsible into a compact, substantially parallel relationship, said frame members when erected forming substantially a quadrilateral, there being a diagonal tension member connected between opposing corners of the quadrilateral.

12. In a collapsible wheeled vehicle, in combination: a vehicle frame comprising a plurality of frame members; and joints between adjacent frame members, the frame members normally lying substantially in a plane when the frame is erected, and the joints being constructed whereby the frame members are collapsible into a compact, substantially parallel relationship, the frame members including wheel-carrying members, and said joints including joints whereby the wheel-carrying members are joined to other frame members and are collapsible with respect to the frame members which are collapsed into substantially parallel relationship.

13. A vehicle as in claim 12, including wheels carried by said wheel-carrying members, a sprocket wheel carried by one of the frame members, a sprocket associated with one of said wheels, and a driving chain between said sprocket wheels.

14. A vehicle as in claim 13, including pedal cranks and pedals, said pedal cranks having joints whereby they are collapsible into a position substantially within the confines of the collapsed frame members.

15. In a collapsible wheeled vehicle, in combination: a vehicle frame comprising a plurality of frame members, and joints between adjacent frame members, the frame members normally lying substantially in a plane when the frame is erected, and the joints being constructed whereby the frame members are collapsible into a compact, substantially parallel relationship, the frame members including wheel-carrying members, and said joints including joints whereby the wheel-carrying members are joined to other frame members and are collapsible with respect to the frame members which are collapsed into substantially parallel relationship, said joints joining said wheel carrying frame members including a joint constructed to allow collapsing movement of a wheel-carrying member is a direction substantially normal to the aforesaid plane whereby the said wheel-carrying member can be folded into a position overlying the aforesaid frame members.

16. A vehicle as in claim 15, including tension means connected to said last wheel-carrying member is a position to be tensioned when said member is erected.

17. In a collapsible wheel vehicle, in combination: a vehicle frame comprising a plurality of frame members; and joints between adjacent frame members, the frame members normally lying substantially in a plane when the frame is erected, and the joints being constructed whereby the frame members are collapsible into a compact, substantially parallel relationship, means connected between frame members applying forces whereby in the erected condition, the frame forms a rigid structure, said means comprising flexible tension members connected between frame members whereby frame members are held in compression, seat supplying means and steering means jointed to frame members and said tension members including members having connection to the seat supporting means and to the steering means, said tension means being constructed to be brought under tension when the frame is erected and whereby tension is supplied to hold the seat supporting members and the steering means in erected condition.

* * * * *